Jan. 4, 1944. F. T. BARR Re. 22,415
METHOD FOR COOLING FLUID CATALYSTS
Original Filed March 1, 1941
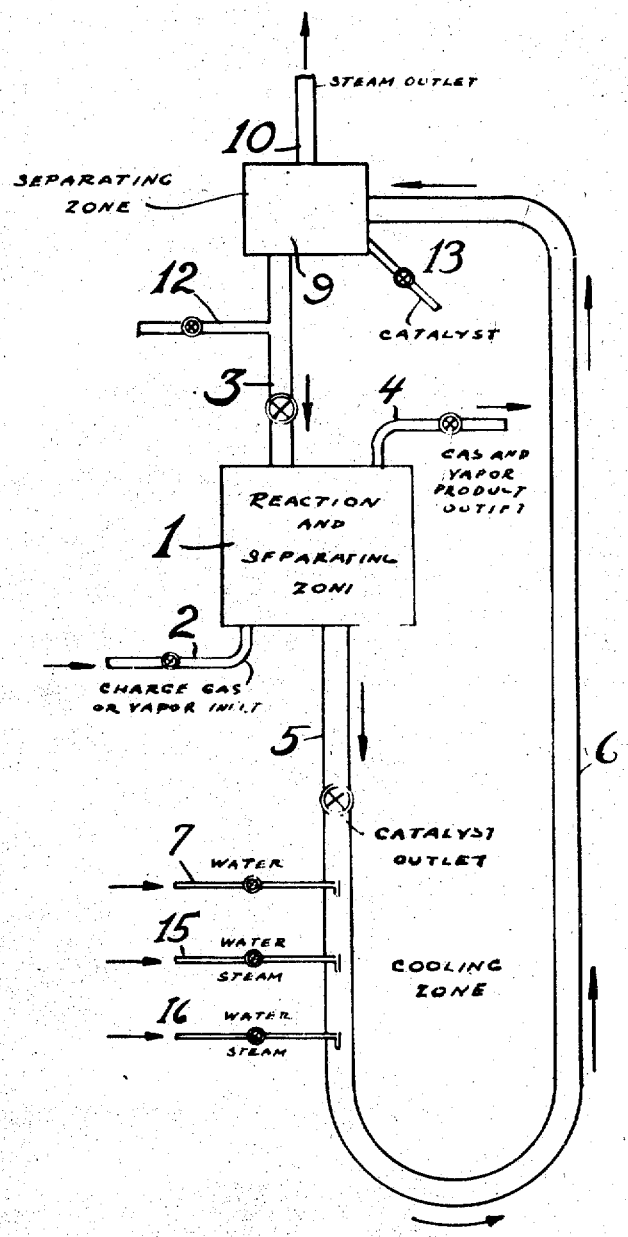
Frank T Barr Inventor
By P. L. Young Attorney Patented Jan. 4, 1944 Re. 22,415

UNITED STATES PATENT OFFICE 22,415

METHOD FOR COOLING FLUID CATALYSTS

Frank T. Barr, Summit, N. J., assignor, by mesne assignments, to Standard Catalytic Company, a corporation of Delaware Original No. 2,309,034, dated January 19, 1943, Serial No. 381,229, March 1, 1941. Application for reissue October 7, 1943, Serial No. 505,413

3 Claims. (Cl. 260—449.6)

The present invention is concerned with the removal of heat from an exothermic reaction, particularly when employing a suspended fluid catalyst. In accordance with the present process, exothermic heat of reaction is absorbed as sensible heat of the fluid catalyst which is removed from the reaction zone and cooled by the regeneration of steam and, if desired, the superheating of the same in a cooling zone. The invention is particularly adapted to the manufacture of products by a reaction involving hydrogen and oxides of carbon. In accordance with the present process, the temperature within the reaction zone is positively controlled by regulating the temperature of the catalyst in a manner as hereinafter described.

It is known in the art to conduct various exothermic chemical reactions and to remove the heat of reaction by suitable means. These means usually comprise liquid cooling mediums which are circulated within or without the reaction zone. Circulation of the cooling means within the reaction zone, however, is frequently impossible or inadvisable owing to the effect of the cooling medium on the course and extent of the reaction, difficulty in separating the cooling medium from reaction products or catalytic material, reduction in reaction space caused by the presence of the medium, etc. On the other hand, circulation of cooling means without the reaction zone is not entirely satisfactory for certain operations owing to the fact that the temperature within the reaction zone is relatively difficult to control within a narrow range, particularly when a catalytic material is employed, and that local overheating occurs along the surface of the catalytic material across the path of the flowing gases. These disadvantages are particularly aggravated and emphasized in chemical reactions involving the hydrogenation of carbon oxides for the production of hydrocarbons having more than one carbon atom in the molecule, since it is essential that the temperature in these reactions be controlled so that no substantial temperature variation during the course of the reaction results.

It has, therefore, been proposed that a fluid suspended catalyst be employed in various types of exothermic reactions and that exothermic heat of reaction be removed by absorbing the same as sensible heat of the catalyst, withdrawing the catalyst from the reaction zone, removing the exothermic heat of reaction, and recycling the cooled catalyst to the reaction zone.

I have now discovered a process by which this operation may be more efficiently and economically conducted. My process overcomes inherent difficulties present in the removal of the heat of reaction from the catalyst and produces additional benefits. In accordance with my process, the catalyst is withdrawn from the reaction zone and passed into a cooling zone wherein the same is cooled by vaporization of water, producing relatively large quantities of steam.

The process of my invention may be readily understood by reference to the drawing illustrating an embodiment of the same. The figure illustrates an operation employing a powdered suspended catalyst utilized in a reaction for the production of hydrocarbon constituents containing more than one carbon atom in the molecule by the hydrogenation of oxides of carbon. The feed gases comprising oxides of carbon and hydrogen are introduced into reaction zone 1 by means of feed line 2. These gases flow upwardly through reaction zone 1 and countercurrently contact a downflowing powdered suspended catalyst which is introduced into zone 1 by means of line 3. It is to be understood that zone 1 comprises suitable means to control the temperature of reaction within the desired range, at least part of which involves absorption of reaction heat as sensible heat of the catalyst. Reaction products comprising vaporized hydrocarbon constituents containing more than one carbon atom in the molecule along with fixed gases and other impurities are withdrawn overhead from reaction zone 1 by means of line 4 and handled, in a manner adapted to segregate the desired products, or further processed in any manner desirable.

The powdered catalyst flows downwardly in zone 1 and absorbs exothermic heat as sensible heat of the catalyst, and is withdrawn from zone 1 by means of line 5. These gases are passed along cooling zone 6 wherein the sensible heat of the catalyst is removed by contacting the same with water which is introduced into zone 6 by means of line 7. The amount of water introduced is adjusted so that complete vaporization of the same is secured. In general, it is preferable to introduce the water at a plurality of stages by means of lines 15 and 16.

The cooled catalyst together with steam passes upwardly through zone 6 and passes into separation zone 9 wherein a separation is made between the steam, which is withdrawn by means of line 10 and the cooled catalyst which is withdrawn by means of line 3 and recycled to the reaction zone. Fresh catalyst may be introduced by means of line 12 while spent catalyst is withdrawn by means of line 13. The temperature of the catalyst may be further controlled if necessary by passing the same through suitable heating or cooling means.

The process of the present invention may be widely varied and is not limited to the construction of the figure. It is to be understood that the respective zones may comprise any suitable number, arrangement, and position of units. The invention is particularly beneficial in that the catalyst is suspended in the steam and passed to the top of the reaction chamber from where it may readily be recycled. The invention may be readily adapted for the removal of heat from any chemical reaction in which heat is evolved. It is, however, particularly suitable for use when employing a suspended powdered catalyst, especially in the reactions involving the hydrogenation of oxides of carbon conducted under conditions to produce hydrocarbon products containing more than one carbon atom in the molecule.

These reactions are generally conducted at a temperature in the range from about 370° to 410° F. It is essential in order to secure a satisfactory yield of the desired quality product that the temperature of the reaction does not vary substantially from the predetermined operating temperature. In general, to secure satisfactory results it is essential that the temperature of the reaction in processes of this character must not vary over a temperature range in excess of about 10° F. and preferably should not vary over a temperature range in excess of 5° F. The catalyst employed in this process may be any suitable catalyst selected from the class of substances which are known as suitable for aiding the hydrogenation of oxides of carbon. Satisfactory catalysts are, for example, cerium, chromium, cobalt, manganese, osmium, palladium, titanium, zinc, iron, and oxides or other compounds of these metals. Mixtures of these catalysts may be employed or the same impregnated with suitable agents adapted to increase their efficiency or strength. In general, in carrying out the present process I have found it preferable to employ a finely divided or powdered catalyst of about 200 to 400 mesh. Although the operation has been described employing a countercurrent flow between the catalyst and the gases in the reaction zone, it is to be understood that concurrent flow, either upflow or downflow, may be employed. When employing a powdered catalyst in an operation of this character, the same may be uniformly distributed as it freely falls through the reaction zone and intimate contact is obtained between the concurrently flowing gases and powdered catalyst. A modification of my invention is to regulate the flow of synthesis gases and catalysts in a manner whereby the velocity of the catalyst passing through the reaction zone exceeds the velocity of the flowing synthesis gases. When concurrent flow is used an additional zone to separate the catalyst from reaction products may be provided. Provision of this auxiliary separating zone may also be desirable with countercurrent flow in the reaction, as, for instance, on line 4 of the accompanying drawing, from which the separated catalyst would join line 5 for charging to the cooling zone.

The extent to which the catalyst is cooled may be readily controlled by the quantity of water introduced into the cooling zone. In general, my process is best adapted to operations in which the catalyst is cooled to a temperature not substantially below about 300° F. If the catalyst is much below this temperature, the water does not flash readily to steam at a useful pressure level.

It is essential, particularly when employing a powdered catalyst that the quantity of water added to the cooling zone be of an amount that will readily vaporize and that the reaction zone be substantially completely free of liquid water. The temperature of the water added may vary widely, but in general it is preferred that the added water be at its boiling point with respect to the pressure employed. A particularly desirable operation as outlined above, is to introduce an aqueous mixture comprising about 5% to 10% of steam into the reaction zone under conditions so that the liquid will be flashed immediately. Much the same effect is obtained in part by introducing the water at a plurality of stages along the path of the flowing catalyst in the cooling zone.

What I claim as new and wish to protect by Letters Patent is:

1. A method of removing heat from reaction chambers in which exothermic reactions are carried out and wherein the desired reaction temperature is materially above the boiling point of water under obtaining pressure conditions which comprises continuously introducing into said reaction chamber a stream of finely divided, heat-absorptive, solid material, said solid material being in direct contact with the reactants within said reaction chamber, the inlet temperature of said finely divided solids so introduced being below the desired reaction temperature whereby heat liberated during said reaction may be absorbed by said solid material, continuously withdrawing a stream of said finely divided contact material from said reaction chamber while at said reaction temperature, injecting water into said stream of solid material so withdrawn, limiting the amount of water so introduced to completely vaporize the water so injected and to cool said solid material, separating the steam formed by the vaporization of the water from the solid material, continuously returning the cooled solid material separated from said steam to the reaction chamber, and regulating the return of flow of said solid material through the reaction chamber to maintain the desired temperature therein.

2. The method defined by claim 1 wherein the solid, heat-absorptive material forms a catalyst for said exothermic reaction.

3. The method defined by claim 1 wherein carbon monoxide and hydrogen are reacted within said reaction chamber to form higher molecular weight hydrocarbon products.

FRANK T. BARR.